United States Patent
Park et al.

(10) Patent No.: US 10,351,699 B2
(45) Date of Patent: Jul. 16, 2019

(54) THERMOPLASTIC RESIN COMPOSITION PROVIDING SUPERIOR LOW-GLOSS CHARACTERISTIC, WEATHER RESISTANCE, AND MECHANICAL PROPERTIES AND EXTRUDED ARTICLE MANUFACTURED FROM THE SAME

(71) Applicant: LG CHEM, LTD., Seoul (KR)

(72) Inventors: Chun Ho Park, Daejeon (KR); Yong Yeon Hwang, Daejeon (KR); Hyun Taek Oh, Daejeon (KR); Min Jung Kim, Daejeon (KR); Sang Mi Lee, Daejeon (KR); Yeong Min Lee, Daejeon (KR); Eun Soo Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 24 days.

(21) Appl. No.: 15/533,362

(22) PCT Filed: Nov. 10, 2016

(86) PCT No.: PCT/KR2016/012935
§ 371 (c)(1),
(2) Date: Jun. 5, 2017

(87) PCT Pub. No.: WO2017/082649
PCT Pub. Date: May 18, 2017

(65) Prior Publication Data
US 2018/0265687 A1 Sep. 20, 2018

(30) Foreign Application Priority Data
Nov. 10, 2015 (KR) ........................ 10-2015-0157050

(51) Int. Cl.
| | | |
|---|---|---|
| *C08L 25/12* | (2006.01) | |
| *C08J 5/00* | (2006.01) | |
| *C08F 265/04* | (2006.01) | |
| *C08F 279/04* | (2006.01) | |
| *C08L 25/16* | (2006.01) | |
| *C08L 51/04* | (2006.01) | |
| *C08L 51/06* | (2006.01) | |

(52) U.S. Cl.
CPC ............ *C08L 25/12* (2013.01); *C08F 265/04* (2013.01); *C08F 279/04* (2013.01); *C08J 5/00* (2013.01); *C08L 25/16* (2013.01); *C08L 51/04* (2013.01); *C08L 51/06* (2013.01); *C08L 2201/02* (2013.01); *C08L 2201/08* (2013.01); *C08L 2203/20* (2013.01); *C08L 2205/02* (2013.01); *C08L 2205/025* (2013.01); *C08L 2205/035* (2013.01); *C08L 2207/04* (2013.01)

(58) Field of Classification Search
CPC ............ C08L 25/10; C08L 25/12; C08L 25/14
See application file for complete search history.

(56) References Cited

U.S. PATENT DOCUMENTS

| 5,932,655 A | 8/1999 | Auclair et al. |
| 2006/0148992 A1* | 7/2006 | Kim ..................... C08F 265/04 525/238 |
| 2015/0011709 A1 | 1/2015 | Ahn et al. |

FOREIGN PATENT DOCUMENTS

| CN | 101407617 A | 4/2009 |
| CN | 102311527 A | 1/2012 |
| KR | 10-2009-0119573 A | 11/2009 |
| KR | 10-2011-0079011 A | 7/2011 |
| KR | 10-2012-0079861 A | 7/2012 |
| KR | 10-2014-0041666 A | 4/2014 |
| KR | 10-2016-0057601 A | 5/2016 |
| KR | 10-2017-0054644 A | 5/2017 |
| WO | 2004108823 A1 | 12/2004 |

(Continued)

OTHER PUBLICATIONS

Wang et al. (Iranian Polymer Journal 18(8) (2009) 663-670).*

(Continued)

*Primary Examiner* — Kuo Liang Peng

(57) ABSTRACT

The present disclosure relates to a thermoplastic resin composition providing superior low-gloss characteristic, weather resistance, and mechanical properties and an extruded article manufactured from the same. More particularly, the present invention relates to a thermoplastic resin composition including 40 to 70% by weight of an aromatic vinyl compound-vinyl cyan compound copolymer as a matrix resin; 20 to 40% by weight of an acrylic graft copolymer (a) in which 46 to 95% by weight of an aromatic vinyl compound-vinyl cyan compound copolymer is grafted to 5 to 54% by weight of a (meth)acrylate-based rubbery polymer having an average particle diameter of 0.05 to 1 µm; 1 to 10% by weight of an acrylic graft copolymer (b) in which 5 to 45% by weight of an aromatic vinyl compound-vinyl cyan compound copolymer is grafted to 55 to 95 % by weight of a (meth)acrylate-based rubbery polymer having an average particle diameter of 0.05 to 1 µm; and 1 to 20% by weight of a large-diameter diene-based graft copolymer (c) in which 80 to 95% by weight of an aromatic vinyl compound-vinyl cyan compound copolymer is grafted to 5 to 20% by weight of a diene-based rubbery polymer having an average particle diameter of 1 to 20 µm, and thus, providing superior low-gloss characteristic, weather resistance, and mechanical properties, and an extruded article manufactured from the same.

11 Claims, No Drawings

(56) References Cited

FOREIGN PATENT DOCUMENTS

WO 2013100448 A1 7/2013

OTHER PUBLICATIONS

Smets (Die Makromolekulare Chemie 91 (1966) 160-174).*
International Search Report for PCT/KR2016/012935 filed on Nov. 10, 2016.
Extended European Search Report for EP Application No. 16864575.2, dated Jul. 19, 2018.
Office Action from Chinese Patent Office for Application No. 201680004894.9 dated Sep. 29, 2018.

* cited by examiner

THERMOPLASTIC RESIN COMPOSITION PROVIDING SUPERIOR LOW-GLOSS CHARACTERISTIC, WEATHER RESISTANCE, AND MECHANICAL PROPERTIES AND EXTRUDED ARTICLE MANUFACTURED FROM THE SAME

CROSS-REFERENCE TO RELATED APPLICATION(S)

This application is a U.S. National Stage of PCT/KR2016/012935 filed Nov. 10, 2016, which claims the priority benefit of Korean Patent Application No. 10-2015-0157050, filed on Nov. 10, 2015 in the Korean Intellectual Property Office, the disclosures of which are incorporated herein by reference.

TECHNICAL FIELD

The present disclosure relates to a thermoplastic resin composition providing superior low-gloss characteristic, weather resistance, and mechanical properties and an extruded article manufactured from the same. More particularly, the present invention relates to a thermoplastic resin composition providing superior mechanical properties, such as superior tensile strength and impact strength, while exhibiting low-gloss characteristic due to light scattering action provided through binding among an acrylic graft copolymer (a) exhibiting high graft efficiency, an acrylic graft copolymer (b) exhibiting low graft efficiency, and a large-diameter diene-based graft copolymer (c) and an extruded article manufactured from the same.

BACKGROUND ART

An acrylonitrile butadiene-styrene (ABS) resin, which is prepared by graft-copolymerizing styrene and an acrylonitrile monomer with a butadiene-based rubbery polymer widely used in the industry, has characteristics such as impact resistance, processability, superior appearance, excellent mechanical strength, and high heat deflection temperature. Accordingly, an ABS resin is used in various fields such as automobile components, electric and electronic products, and building materials.

However, since an ethylenically unsaturated polymer is present in a butadiene rubber constituting an ABS resin, the ABS resin is easily oxidized due to ultraviolet rays, light, heat, and the like in the presence of oxygen. Accordingly, the appearance and color of the resin are changed and the mechanical properties thereof are deteriorated. Therefore, such an ABS resin is not suitable for external application.

Accordingly, an acrylate-styrene-acrylonitrile (ASA)-based resin providing superior weather resistance and aging resistance with superior properties and including an acrylic rubber, in which an ethylenically unsaturated polymer is not present, has emerged as an alternative. An ASA-based resin is mainly used for external application due to superior weather resistance, chemical resistance, thermal stability, and the like. In addition, an ASA-based resin is used as an end product itself without any treatment such as surface-coating, painting, or plating. An ASA resin is widely used for external electrical and electronic parts, building materials, sporting goods, automobile components, and the like. In addition, the resin is mainly applied to satellite antennas, kayak paddles, chassis joiners and profiles, door panels, automobile radiator grills, side mirror housings, and the like.

In addition, since an ASA-based resin does not require a post-process such as plating or painting, the resin has advantages such as reduced manufacturing cost and eco-friendliness. However, an ASA-based resin has disadvantages such as insufficient impact strength and non-luxurious appearance due to unaesthetic high gloss. Accordingly, demand for an ASA-based resin exhibiting low gloss is increasing.

To address this problem, a method of embossing a surface of an ASA-based resin or coating the surface with a low-gloss material has been applied. However, such a method causes processing cost increase, and decrease of low-gloss effect due to abrasion during processing. In accomplishing low-gloss effect without use of such coating methods or application of a pad, particle diameter is an important factor. When large-diameter particles having an average particle diameter of 1 µm or more are present on a surface of the resin, the smoothness of the resin surface is adjusted to be larger than the visible light region and thus the incident light is scattered, whereby low-gloss effect is exhibited. If an average particle diameter of an acrylate-styrene-acrylonitrile resin may be adjusted to 1 µm or more, low-gloss effect may be exhibited without application of a large-diameter ABS resin. However, it is difficult to prepare an ASA resin having an average particle diameter of 1 µm or more through emulsion polymerization. To prepare an ASA resin having an average particle diameter of 1 µm or more, bulk polymerization is generally performed. However, although an ASA resin with an average particle diameter of 1 µm or more prepared by bulk polymerization exhibits low-gloss effect, mechanical properties thereof are decreased. Therefore, there is a need for development of an ASA-based resin exhibiting superior low-gloss characteristic while providing superior mechanical properties and weather resistance.

DISCLOSURE

Technical Problem

Therefore, the present invention has been made in view of the above problems, and it is one object of the present invention to provide a thermoplastic resin composition that exhibits superior weather resistance and impact resistance with excellent low-gloss effect, and thus, is suitable as a material of a sheet-type extruded article and the like.

It is another object of the present invention to provide an extruded article manufactured from the thermoplastic resin composition.

The above and other objects can be accomplished by the present disclosure described below.

Technical Solution

In accordance with an aspect of the present invention, the above and other objects can be accomplished by the provision of a thermoplastic resin composition including an aromatic vinyl compound-vinyl cyan compound copolymer as a matrix resin; an acrylic graft copolymer (a) in which 46 to 95% by weight of an aromatic vinyl compound-vinyl cyan compound copolymer is grafted to 5 to 54% by weight of a (meth)acrylate-based rubbery polymer having an average particle diameter of 0.05 to 1 µm; an acrylic graft copolymer (b) in which 5 to 45% by weight of an aromatic vinyl compound-vinyl cyan compound copolymer is grafted to to 95% by weight of a (meth)acrylate-based rubbery polymer having an average particle diameter of 0.05 to 1 µm; and a large-diameter diene-based graft copolymer (c) in which 80 to 95% by weight of an aromatic vinyl compound-vinyl cyan compound copolymer is grafted to 5 to 20% by weight of a diene-based rubbery polymer having an average particle diameter of 1 to 20 μm, wherein, with respect to a total weight of the matrix resin, the acrylic graft copolymer (a), the acrylic graft copolymer (b), and the large-diameter diene-based graft copolymer (c), the matrix resin is included in an amount of 40 to 70% by weight; the acrylic graft copolymer (a) is included in an amount of 20 to 40% by weight; the acrylic graft copolymer (b) is included in an amount of 1 to 10% by weight; and the large-diameter diene-based graft copolymer (c) is included in an amount of 1 to 20% by weight.

In accordance with another aspect of the present invention, there is provided an extruded article manufactured from the thermoplastic resin composition.

Advantageous Effects

As apparent from the fore-going, the present invention provides a thermoplastic resin composition exhibiting superior low-gloss characteristic, weather resistance, and mechanical properties, even without use of a matting agent, a special embossed die, a conveyor belt, or a special coating, when manufactured into a sheet-type extruded article and the like and an extruded article manufactured from the same.

BEST MODE

Hereinafter, the present invention is described in detail.

A thermoplastic resin composition of the present disclosure includes an aromatic vinyl compound-vinyl cyan compound copolymer as a matrix resin; an acrylic graft copolymer (a) in which 46 to 95% by weight of an aromatic vinyl compound-vinyl cyan compound copolymer is grafted to 5 to 54% by weight of a (meth)acrylate-based rubbery polymer having an average particle diameter of 0.05 to 1 μm; an acrylic graft copolymer (b) in which 5 to 45% by weight of an aromatic vinyl compound-vinyl cyan compound copolymer is grafted to 55 to 95% by weight of a (meth)acrylate-based rubbery polymer having an average particle diameter of 0.05 to 1 μm; and a large-diameter diene-based graft copolymer (c) in which 80 to 95% by weight of an aromatic vinyl compound-vinyl cyan compound copolymer is grafted to 5 to % by weight of a diene-based rubbery polymer having an average particle diameter of 1 to 20 μm, wherein, with respect to a total weight of the matrix resin, the acrylic graft copolymer (a), the acrylic graft copolymer (b), and the large-diameter diene-based graft copolymer (c), the matrix resin is included in an amount of 40 to 70% by weight; the acrylic graft copolymer (a) is included in an amount of 20 to 40% by weight; the acrylic graft copolymer (b) is included in an amount of 1 to 10% by weight; and the large-diameter diene-based graft copolymer (c) is included in an amount of 1 to 20% by weight. Here, the binding among the acrylic graft copolymer (a), the acrylic graft copolymer (b), and the large-diameter diene-based graft copolymer (c) allows realization of weather resistance, low-gloss characteristic, weather resistance, and superior mechanical properties without a separate matting agent or impact modifier.

The aromatic vinyl compound-vinyl cyan compound copolymer included in each of the acrylic graft copolymer (a), the acrylic graft copolymer (b), and the large-diameter diene-based graft copolymer (c) may include, for example, 60 to 90% by weight of an aromatic vinyl compound and 10 to 40% by weight of a vinyl cyan compound, or 65 to 85% by weight of an aromatic vinyl compound and 15 to 35% by weight of a vinyl cyan compound.

The acrylic graft copolymer (a) may be, for example, a copolymer wherein 46 to 95% by weight of an aromatic vinyl compound-vinyl cyan compound copolymer is grafted to 5 to 54% by weight of a (meth)acrylate-based rubber in a graft efficiency of 46 to 95%. In this case, superior impact strength and property balance are provided.

Alternatively, the acrylic graft copolymer (a) may be, for example, a copolymer wherein 45 to 85% by weight of an aromatic vinyl compound-vinyl cyan compound copolymer is grafted to 15 to 55% by weight of a (meth)acrylate-based rubber in a graft efficiency of 45 to 85%.

In another embodiment, the acrylic graft copolymer (a) may include 25 to 55% by weight or 30 to 50% by weight of a (meth)acrylate-based rubber, 15 to 40% by weight or 20 to 36% by weight of an aromatic vinyl compound, and 15 to % by weight or 20 to 40% by weight of a vinyl cyan compound. Within this range, superior impact strength and property balance are provided.

In another embodiment, the acrylic graft copolymer (a) may have a graft efficiency of 55 to 85%, 55 to 75%, or 60 to 70% Within this range, superior mechanical properties and low gloss are exhibited.

The acrylic graft copolymer (a) may have, for example, a weight average molecular weight of 50,000 to 150,000 g/mol, or 70,000 to 140,000 g/mol. Within this range, superior impact strength and property balance are exhibited.

A general polymerization method, such as bulk polymerization, solution polymerization, emulsion polymerization, suspension polymerization may be applied. Preferably, emulsion polymerization is used.

When the acrylic graft copolymer (a) is polymerized, for example, an emulsifier, a molecular weight regulator, and a polymerization initiator may be included. An antioxidant and a stabilizer are added to an obtained graft copolymer latex and agglomeration is performed, followed by dehydration and drying. As a result, a graft copolymer powder may be obtained.

The acrylic graft copolymer (a) may be included, for example, in an amount of 20 to 40% by weight, or 23 to 35% by weight in the thermoplastic resin composition. Within this range, superior impact resistance is provided.

The acrylic graft copolymer (b) may be, for example, a copolymer wherein 5 to 45% by weight of an aromatic vinyl compound-vinyl cyan compound copolymer is grafted 55 to 95% by weight of a (meth)acrylate-based rubber in a graft efficiency of 5 to 45%. In this case, superior low gloss characteristic is exhibited.

Alternatively, the acrylic graft copolymer (b) may be, for example, a copolymer wherein 10 to 30% by weight of an aromatic vinyl compound-vinyl cyan compound copolymer is grafted to 70 to 90% by weight of a (meth)acrylate-based rubber in a graft efficiency of 10 to 45%. In this case, superior low gloss characteristic is exhibited.

In another embodiment, the acrylic graft copolymer (a) may include 75 to 85% by weight or 70 to 80% by weight of a (meth)acrylate-based rubber; 5 to 24% by weight, 10 to 20% by weight, or 12 to 18% by weight of an aromatic vinyl compound; and 0.1 to 20% by weight, 1 to 15% by weight, or 2 to 12% by weight of a vinyl cyan compound. Within this range, superior impact strength and property balance are provided.

In another embodiment, the acrylic graft copolymer (b) may have a graft efficiency of 15 to 45%, or 15 to 40%. Within this range, superior mechanical properties and low gloss are exhibited.

When the graft rate of an acrylic copolymer is lowered to 5 to 45% as in the acrylic graft copolymer (b), particles having low graft efficiency are agglomerated during processing. Accordingly, an average particle diameter is increased to 1 μm or more, whereby low-gloss effect is exhibited.

Due to binding between the acrylic graft copolymer (b) and the large-diameter diene-based graft copolymer (c), low-gloss characteristic increases and superior weather resistance and mechanical properties are exhibited.

The acrylic graft copolymer (b) may have, for example, a weight average molecular weight of 50,000 to 200,000 g/mol, or 100,000 to 170,000 g/mol. Within this range, superior light scattering effect is exhibited.

A general polymerization method, such as bulk polymerization, solution polymerization, emulsion polymerization, suspension polymerization may be applied. Preferably, emulsion polymerization is used.

When the acrylic graft copolymer (b) is copolymerized, for example, an emulsifier and a polymerization initiator may be included. In this case, a grafting agent is not used. An antioxidant and a stabilizer are added to the obtained graft latex and then agglomeration is performed, followed by dehydration and drying. As a result, a graft copolymer powder is obtained.

The acrylic graft copolymer (b) may be included, for example, in an amount of 1 to 10% by weight or 3 to 8% by weight in the thermoplastic resin composition. Within this range, superior low-gloss characteristic is exhibited.

The (meth)acrylate-based rubber included in each of the acrylic graft copolymers (a) and (b) may be a $C_2$ to $C_8$ alkyl(meth)acrylate polymer. When each of the acrylic graft copolymers (a) and (b) is polymerized, one or more selected from the group consisting of acrylic acid, methacrylic acid, alkyl (meth)acrylate, maleic anhydride, and N-substituted maleimide, as needed, may be further included.

The (meth)acrylate rubber included in each of the acrylic graft copolymers (a) and (b) may be, for example, one or more selected from the group consisting of methyl acrylate rubber, ethyl acrylate rubber, propyl acrylate rubber, butyl acrylate rubber, 2-ethylhexyl acrylate rubber, methyl methacrylate rubber, ethyl methacrylate rubber, propyl methacrylate rubber, and butyl methacrylate rubber.

(Meth)acrylate-based rubber particles included in each of the acrylic graft copolymers (a) and (b) may have an average particle diameter of, for example, 0.05 to 1 μm, 0.07 to 0.7 μm, or 0.1 to 0.5 μm. Within this range, superior impact strength is exhibited, and a final thermoplastic resin also exhibits superior impact strength.

The large-diameter diene-based graft copolymer (c) may be, for example, a copolymer wherein 80 to 95% by weight or 85 to 92% by weight of an aromatic vinyl compound-vinyl cyan compound copolymer is grafted to 5 to 20% by weight or 8 to 15% by weight of a diene-based rubbery polymer. In this case, superior impact strength, processability, and property balance are provided.

In an embodiment, the aromatic vinyl compound may be included in an amount of 55 to 85% by weight or 60 to 80% by weight based on a total weight of the large-diameter diene-based graft copolymer (c). Within this range, superior thermal stability is provided. In addition, pyrolysis does not occur during processing, and thus, superior processability is provided.

In an embodiment, the vinyl cyan compound may be included in an amount of 5 to 35% by weight, or 10 to 30% by weight based on a total weight of the large-diameter diene-based graft copolymer (c). Within this range, superior chemical resistance and superior polymerization degree are provided, whereby superior impact strength is exhibited.

In another embodiment, the large-diameter diene-based graft copolymer (c) may have, for example, a weight average molecular weight of 50,000 to 200,000 g/mol, or 120,000 to 170,000 g/mol. Within this range, light scattering effect, superior impact strength and property balance are exhibited.

When the large-diameter diene-based graft copolymer (c) is polymerized, for example, a reactive medium, a molecular weight regulator, and a polymerization initiator may be included. A resultant polymerized product is passed through a volatilization vessel to remove an unreactive monomer and a reactive medium. As a result, a pellet-type graft copolymer may be obtained.

The diene-based rubbery polymer may be, for example, one or more selected from the group consisting of a butadiene rubbery polymer, a butadiene-styrene rubbery polymer, and an isoprene rubbery polymer.

The average particle diameter of the diene-based rubbery polymer may be, for example, 1 to 20 μm, 2 to 15 μm, to 15 μm, or 7 to 13 μm. Within this range, superior impact strength and low-gloss characteristic are exhibited.

The large-diameter diene-based graft copolymer (c) may be included, for example, in an amount of 1 to 20% by weight or 5 to 15% by weight in the thermoplastic resin composition. Within this range, superior processability and low-gloss characteristic are exhibited.

When the large-diameter diene-based graft copolymer (c) is polymerized, for example, a reactive medium selected from ethyl benzene, toluene, and xylene; a polymerization initiator selected from cyclohexane-based initiators, peroxide-based initiators, perbenzoate-based initiators, and dicarbonate-based initiators; and a mercaptane-based molecular weight regulator may be included.

In an embodiment, 20 to 35 parts by weight of a reactive medium, 0.01 to 1 part by weight of a polymerization initiator, and 0.01 to 1 part by weight of a molecular weight regulator may be included based on 100 parts by weight of a total weight of the aromatic vinyl compound and the vinyl cyan compound.

In a particular embodiment, the polymerization initiator may be one or more selected from the group consisting of 1,1-bis(t-butylperoxy)-3,3,5-trimethyl cyclohexane, 1,1-bis (t-butylperoxy) cyclohexane, 1,1-bis(t-butylperoxy)2-methyl cyclohexane, benzoyl peroxide, cumene hydroperoxide, t-butyl perbenzoate, and isopropyl peroxydicarbonate.

The matrix resin of the present disclosure may be an aromatic vinyl compound-vinyl cyan compound copolymer including, for example, 60 to 90% by weight of an aromatic vinyl compound and 10 to 40% by weight of a vinyl cyan compound, or 65 to 85% by weight of an aromatic vinyl compound and 15 to 35% by weight of a vinyl cyan compound. Here, a polymerization method is not specifically limited. When bulk polymerization is used, it is possible to prepare a graft copolymer having an average particle diameter of 1.0 μm or more. In addition, the bulk polymerization is economically and environmentally preferable in that the content of an unreactive monomer is reduced. Further, since an emulsifier, a coagulant, and the like do not remain, superior thermal stability is exhibited.

The bulk polymerization may adopt a batch method and a continuous method. In terms of the stability of reaction and increase in molecular weight, a continuous method is preferred.

The aromatic vinyl compound-vinyl cyan compound copolymer may have, for example, a weight average molecular weight of 80,000 to 250,000 g/mol, or 120,000 to 200,000 g/mol. Within this range, superior impact strength and property balance are exhibited.

The aromatic vinyl compound of the present disclosure may b, for example, one or more selected from the group consisting of styrene, α-methyl styrene, p-methyl styrene, 2,4-dimethyl styrene, and vinyl toluene.

The vinyl cyan compound of the present disclosure may be, for example, one or more selected from the group consisting of acrylonitrile, methacrylonitrile, and ethacrylonitrile.

The matrix resin may be included, for example, in an amount of 40 to 70% by weight or 52 to 67% by weight in the thermoplastic resin composition. Within this range, superior tensile strength, impact strength, and processability are provided.

The thermoplastic resin composition may further include, for example, one or more additives selected from the group consisting of a flame retardant, an antioxidant, an antistatic agent, an anti-dripping agent, a releasing agent, an antimicrobial agent, a heat stabilizer, a lubricant, a UV stabilizer, an impact modifier, a filler, an inorganic additive, a stabilizer, a pigment, and a dye.

The additives may be included, for example, in an amount of 20 parts by weight or less based on 100 parts by weight of the thermoplastic resin composition.

The thermoplastic resin composition may have, for example, a gloss of 22 to 38 measured according to ASTM D523.

The thermoplastic resin composition of the present disclosure may be applied to extruded articles such as an electric and electronic product, an automobile component, a building interior and exterior material, and a furniture interior and exterior material. The building exterior material may be, for example, a panelling board or a building exterior decorative material.

The extruded articles disclosed in the present disclosure are manufactured from the thermoplastic resin composition.

Now, the present invention will be described in more detail with reference to the following preferred examples. However, these examples are provided for illustrative purposes only. Those skilled in the art will appreciate that various modifications, additions and substitutions are possible, without departing from the scope and spirit of the invention. Therefore, it is obvious that the modifications, additions and substitutions are within the scope of the present invention.

EXAMPLE

Example 1

Acrylic Graft Copolymer Having High Graft Efficiency (a)

50 parts by weight of a butyl (meth)acrylate rubbery polymer latex having an average particle diameter of 0.2 μm were mixed with 30 parts by weight of styrene and 20 parts by weight of acrylonitrile (To prepare the butyl (meth)acrylate rubbery polymer latex, a grafting agent and a crosslinking agent were used).

0.3 parts by weight of sodium laureth sulfate (SLS), as an emulsifier, 0.4 parts by weight of mercaptane, as a molecular weight regulator, and 0.3 parts by weight of t-butyl hyperoxide (TBHP), as a peroxide polymerization initiator, were added based on 100 parts by weight of the mixture including the butyl (meth)acrylate rubbery polymer latex, styrene, and acrylonitrile and graft copolymerization was performed. Here, a peroxide initiator and an activation solution (0.144 parts by weight of SFS, 0.02 parts by weight of EDTA, and 0.01 parts by weight of FES) were continuously added at 75° C. over four hours, and graft rate increase and aggregate generation were minimized.

After terminating polymerization, a polymerization conversion rate of an obtained graft copolymer latex was 97% or more. An antioxidant and a stabilizer were added to the latex, and agglomeration was performed using an aqueous sulfuric acid solution at 80° C. or more, followed be dehydration and drying. As a result, a graft copolymer powder was obtained. Here, a graft efficiency was 66.2%.

Acrylic Copolymer Having Low Graft Efficiency (b)

80 parts by weight of a butyl (meth)acrylate rubbery polymer latex having an average particle diameter of 0.2 μm were mixed with 12 parts by weight of styrene and 8 parts by weight of acrylonitrile.

(The butyl (meth)acrylate rubbery polymer latex was prepared only using a crosslinking agent without a grafting agent.)

0.5 parts by weight of SLS, as an emulsifier, and 0.3 parts by weight of potassium persulfate (KPS), as a persulfate-based polymerization initiator, were added based on 100 parts by weight of the mixture including the butyl (meth)acrylate rubbery polymer latex, styrene, and acrylonitrile, and graft copolymerization was performed.

Here, a molecular weight regulator was not used, and the SLS and the KPS were added batchwise to lower a graft rate.

After terminating polymerization, a polymerization conversion rate of an obtained graft copolymer latex was 96% or more. An antioxidant and a stabilizer were added to the latex, and agglomeration was performed using an aqueous sulfuric acid solution at 40° C., followed be dehydration and drying. As a result, a graft copolymer powder was obtained. Here, a graft efficiency was 24.8%.

Large-Diameter Diene-Based Graft Copolymer (c)

60 parts by weight of styrene, 25 parts by weight of acrylonitrile, and 15 parts by weight of a butadiene rubbery polymer were mixed. As the butadiene rubbery polymer, a butadiene rubbery polymer having an average particle diameter of 10 μm was used.

35 parts by weight of ethyl benzene were added to 100 parts by weight of the resultant mixture to dissolve the butadiene rubbery polymer. Subsequently, 5 parts by weight of polybutene having a number average molecular weight of 900 g/mol, as a molecular weight regulator, 0.02 parts by weight of 1,1-bis(t-butylperoxy)-3,3,5 trimethyl cyclohexane, as a polymerization initiator, and 0.03 parts by weight of t-dodecyl mercaptane, as a molecular weight regulator, were added to the mixture, thereby preparing a polymerization solution.

A resultant polymerization solution was fed into a reactor at a rate of 10 l/hr. Particularly, a first step polymerization was performed at 110° C., a second step polymerization was performed at 130° C., and a third step polymerization was performed at 145° C. while adding a mixture, which was prepared by dissolving 0.8 parts by weight of t-dodecyl mercaptane in 99.2 parts by weight of ethyl benzene, to the polymerization solution at a rate of 10 l/hr.

A resultant polymerized product was passed through a volatilization vessel to remove an unreactive monomer and a reactive medium. As a result, a pellet-type ABS graft copolymer was prepared.

<Preparation of Resin Composition>

Based on 100 parts by weight of a resin composition, parts by weight of the acrylic graft copolymer (a), 3 parts by weight of the acrylic graft copolymer (b), 10 parts by weight of the large-diameter diene-based graft copolymer (c), 60 parts by weight of a SAN resin (a copolymer that included 70 parts by weight of styrene and 30 parts by weight of acrylonitrile and had a weight average molecular weight of 150,000 g/mol), as a hard matrix resin, 2 parts by weight of a lubricant, 0.3 parts by weight of an antioxidant, and 0.3 parts by weight of a UV stabilizer were mixed. Subsequently, a thermoplastic resin composition pellet was prepared using a 40 n extrusion kneader at a cylinder temperature of 200° C.

Example 2

An experiment was carried out in the same manner as in Example 1, except that 30 parts by weight of the acrylic graft copolymer (a), 5 parts by weight of the acrylic graft copolymer (b), and 5 parts by weight of the large-diameter diene-based graft copolymer (c) were used.

Example 3

An experiment was carried out in the same manner as in Example 1, except that 25 parts by weight of the acrylic graft copolymer (a), 5 parts by weight of the acrylic graft copolymer (b), and 10 parts by weight of the large-diameter diene-based graft copolymer (c) were used.

Example 4

An experiment was carried out in the same manner as in Example 1, except that 20 parts by weight of the acrylic graft copolymer (a), 5 parts by weight of the acrylic graft copolymer (b), and 15 parts by weight of the large-diameter diene-based graft copolymer (c) were used.

Example 5

An experiment was carried out in the same manner as in Example 1, except that 55 parts by weight of the matrix resin, 27 parts by weight of the acrylic graft copolymer (a), and 3 parts by weight of the acrylic graft copolymer (b) were used and a large-diameter diene-based graft resin (c-2) including a butadiene rubbery polymer with an average particle diameter of 2 μm was used in an amount of 15 parts by weight instead of the large-diameter diene-based graft copolymer (c).

Example 6

An experiment was carried out in the same manner as in Example 1, except that 50 parts by weight of the matrix resin, 27 parts by weight of the acrylic graft copolymer (a), and 3 parts by weight of the acrylic graft copolymer (b) were used and a large-diameter diene-based graft resin (c-3) including a butadiene rubbery polymer with an average particle diameter of 1 μm was used in an amount of 20 parts by weight instead of the large-diameter diene-based graft copolymer (c).

Example 7

An experiment was carried out in the same manner as in Example 1, except that 60 parts by weight of the matrix resin, 27 parts by weight of the acrylic graft copolymer (a), and 10 parts by weight of the large-diameter diene-based graft copolymer (c) were used and an acrylic copolymer (b-2) (having a graft efficiency of 15%), which was prepared by graft-polymerizing 80% by weight of a butyl acrylate rubber, 18% by weight of styrene, and 2% by weight of acrylonitrile, was used in an amount of 3 parts by weight instead of the acrylic graft copolymer (b).

Example 8

An experiment was carried out in the same manner as in Example 1, except that 55 parts by weight of the matrix resin, 27 parts by weight of the acrylic graft copolymer (a), and 10 parts by weight of the large-diameter diene-based graft copolymer (c) were used and an acrylic copolymer (b-3) (having a graft efficiency of 40%), which was prepared by graft-polymerizing 70% by weight of a butyl acrylate rubber, 18% by weight of styrene, and 12% by weight of acrylonitrile, was used in an amount of 8 parts by weight instead of the acrylic graft copolymer (b).

Example 9

An experiment was carried out in the same manner as in Example 1, except that 55 parts by weight of the matrix resin, 3 parts by weight of the acrylic graft copolymer (b), and 10 parts by weight of the large-diameter diene-based graft copolymer (c) were used and an acrylic copolymer (a-2) (having a graft efficiency of 78%), which was prepared by graft-polymerizing 30% by weight of butyl acrylate rubber, 36% by weight of styrene, and 24% by weight of acrylonitrile, was used in an amount of 32 parts by weight instead of the acrylic graft copolymer (a).

Example 10

An experiment was carried out in the same manner as in Example 1, except that 55 parts by weight of the matrix resin, 3 parts by weight of the acrylic graft copolymer (b), and 10 parts by weight of the large-diameter diene-based graft copolymer (c) were used and an acrylic copolymer (a-3) (having a graft efficiency of 87%), which was prepared by graft-polymerizing 40% by weight of butyl acrylate rubber, 20% by weight of styrene, and 40% by weight of acrylonitrile, was used in an amount of 32 parts by weight instead of the acrylic graft copolymer (a).

Comparative Example 1

An experiment was carried out in the same manner as in Example 1, except that 35 parts by weight of the acrylic graft copolymer (a), 0 parts by weight of the acrylic graft copolymer (b), and 5 parts by weight of the large-diameter diene-based graft copolymer (c) were used.

Comparative Example 2

An experiment was carried out in the same manner as in Example 1, except that 29. 5 parts by weight of the acrylic graft copolymer (a), 0.5 parts by weight of the acrylic graft copolymer (b), and 10 parts by weight of the large-diameter diene-based graft copolymer (c) were used.

Comparative Example 3

An experiment was carried out in the same manner as in Example 1, except that 15 parts by weight of the acrylic graft copolymer (a), 15 parts by weight of the acrylic graft copolymer (b), and 10 parts by weight of the large-diameter diene-based graft copolymer (c) were used.

Comparative Example 4

An experiment was carried out in the same manner as in Example 1, except that 20 parts by weight of the acrylic graft copolymer (a), 0 parts by weight of the acrylic graft copolymer (b), and 20 parts by weight of the large-diameter diene-based graft copolymer (c) were used.

Comparative Example 5

An experiment was carried out in the same manner as in Example 1, except that 40 parts by weight of the acrylic graft copolymer (a), 0 parts by weight of the acrylic graft copolymer (b), and 0 parts by weight of the large-diameter diene-based graft copolymer (c) were used.

Comparative Example 6

An experiment was carried out in the same manner as in Example 1, except that 15 parts by weight of the acrylic graft copolymer (a), 12 parts by weight of the acrylic graft copolymer (b), and 13 parts by weight of the large-diameter diene-based graft copolymer (c) were used.

Comparative Example 7

An experiment was carried out in the same manner as in Example 1, except that 10 parts by weight of the acrylic graft copolymer (a), 8 parts by weight of the acrylic graft copolymer (b), and 22 parts by weight of the large-diameter diene-based graft copolymer (c) were used.

Test Example

The thermoplastic resin composition pellet obtained according to each of the Examples 1 to 4 and Comparative Examples 1 to 7 was injection-molded and prepared into a specimen. The Izod impact strength, tensile strength, and weather resistance of the prepared specimen were measured. In addition, the thermoplastic resin composition pellet was prepared into a sheet with a size of 0.3 mm at a cylinder temperature of 200° C. by means of a 40 n sheet extruder. The prepared sheet was subjected to a gloss measurement test. Test results are summarized in Tables 1 and 2 below.

Measurement Methods

Average particle diameter (μm): Measured using intensity Gaussian distribution (Nicomp 380) according to a dynamic laser light scattering method.

Graft rate: A polymer was separated into particles and dried, followed by immersing and swelling in acetone at room temperature. The swelled particles were centrifuged at 0° C. and 12000 rpm for 120 minutes. Subsequently, an insoluble acetone gel and a soluble acetone sol were collected and dried in a hot air drier to obtain a graft rate (%) from Mathematical Equation 1 below:

Graft rate (%)=(Total weight of grafted monomer/total weight of shell monomer)×100 [Mathematical Equation 1]

Weather resistance: A specimen was allowed to sit at 60° C. for 1000 hours in QUV (UV2000), and then a discoloration degree (ΔE) was measured by means of a color difference meter. Here, ΔE refers to an arithmetic mean value of CIE Lab values before and after weather resistance tests. Weather resistance is superior as ΔE is close to 0.

Izod impact strength (⅛" notched, 23° C., kgf·cm/cm): Measured according to ASTM D256.

Tensile Strength (50 mm/min, kg/cm$^2$): Measured according to ASTM D638.

Gloss: Measured at 45° according to ASTM D523 by means of a gloss meter. Here, surface gloss is superior with decreasing gloss value.

Weight average molecular weight (g/mol): Measured by high temperature-gel permeation chromatography (HT-GPC).

TABLE 1

| Classification | | Example 1 | Example 2 | Example 3 | Example 4 |
|---|---|---|---|---|---|
| Composition | Matrix resin | 60 | 60 | 60 | 60 |
| | a | 27 | 30 | 25 | 20 |
| | b | 3 | 5 | 5 | 5 |
| | c | 10 | 5 | 10 | 15 |
| Weather resistance | | 1.3 | 1.1 | 1.0 | 1.4 |
| Impact strength | | 7.8 | 6.9 | 7.3 | 5.8 |
| Tensile Strength | | 534 | 535 | 538 | 542 |
| Gloss | | 30 | 32 | 27 | 24 |

TABLE 2

| Classification | | Example 5 | Example 6 | Example 7 | Example 8 | Example 9 | Example 10 |
|---|---|---|---|---|---|---|---|
| Composition | Matrix resin | 55 | 50 | 60 | 55 | 55 | 55 |
| | a | 27 | 27 | 27 | 27 | | |
| | a-2 | | | | | 32 | |
| | a-3 | | | | | | 32 |
| | b | 3 | 3 | | | 3 | 3 |
| | b-2 | | | 3 | | | |
| | b-3 | | | | 8 | | |
| | c | | 10 | 10 | 10 | 10 | 10 |
| | c-2 | 15 | | | | | |
| | c-3 | | 20 | | | | |
| Weather resistance | | 1.8 | 2.2 | 1.3 | 1.2 | 1.4 | 1.4 |
| Impact strength | | 12 | 15 | 6 | 7 | 6 | 3 |
| Tensile Strength | | 580 | 610 | 550 | 500 | 510 | 500 |
| Gloss | | 35 | 38 | 29 | 32 | 33 | 39 |

TABLE 3

| Classification | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Composition | Matrix resin | 60 | 60 | 60 | 60 | 60 | 60 | 60 |
| | a | 35 | 29.5 | 15 | 10 | 40 | 15 | 10 |
| | b | 0 | 0.5 | 25 | 0 | 0 | 12 | 8 |
| | c | 5 | 10 | 0 | 30 | 0 | 13 | 22 |
| Weather resistance | | 2.0 | 2.4 | 0.8 | 7.0 | 0.5 | 3.6 | 4.5 |
| Impact strength | | 6.5 | 7.5 | 3.2 | 4.5 | 3.9 | 4.2 | 3.8 |
| Tensile Strength | | 526 | 531 | 493 | 555 | 532 | 490 | 521 |
| Gloss | | 46 | 45 | 22 | 26 | 67 | 24 | 31 |

It can be confirmed that, as shown in Tables 1 to 3, the thermoplastic resin composition of the present disclosure exhibits superior low-gloss effect while maintaining mechanical properties, such as tensile strength and impact strength, and weather resistance even without use of a matting agent. In addition, it can be confirmed that low gloss and impact strength are improved by optimizing the contents of the graft copolymers, such as the acrylic graft copolymer (a), the acrylic graft copolymer (b), and the large-diameter diene-based graft copolymer (c), to the matrix resin and graft efficiency thereof.

In addition, it can be confirmed that, in the cases of Comparative Examples 1 and 2 in which an acrylic copolymer having low graft efficiency is excluded or is included in a small amount, low-gloss effect is decreased and, in the case of Comparative Example 3 in which a large-diameter diene-based graft copolymer is excluded and an acrylic copolymer having low graft efficiency is included in a large amount, impact strength and tensile strength are decreased.

In addition, it can be confirmed that, in the case of Comparative Example 4 in which an acrylic copolymer having low graft efficiency is excluded and a large-diameter diene-based graft copolymer is included in a large amount, weather resistance is very poor and, in the case of Comparative Example 5 in which both an acrylic copolymer having low graft efficiency and a large-diameter diene-based graft copolymer are excluded, weather resistance and impact strength are decreased and low-gloss effect is very poor.

Further, it can be confirmed that, in the cases of Comparative Examples 6 and 7 in which both an acrylic copolymer having high graft efficiency and a diene-based graft copolymer are included in a large amount, weather resistance, impact strength, and tensile strength are decreased.

What is claimed is:

1. A thermoplastic resin composition, comprising:
   40 to 70% by weight of an aromatic vinyl compound-vinyl cyan compound copolymer as a matrix resin;
   20 to 40% by weight of an acrylic graft copolymer (a) in which 46 to 95% by weight of an aromatic vinyl compound-vinyl cyan compound copolymer is grafted to 5 to 54% by weight of a (meth)acrylate-based rubbery polymer having an average particle diameter of 0.05 to 1 μm;
   1 to 10% by weight of an acrylic graft copolymer (b) in which 5 to 45% by weight of an aromatic vinyl compound-vinyl cyan compound copolymer is grafted to 55 to 95% by weight of a (meth)acrylate-based rubbery polymer having an average particle diameter of 0.05 to 1 μm; and
   1 to 20% by weight of a large-diameter diene-based graft copolymer (c) in which 80 to 95% by weight of an aromatic vinyl compound-vinyl cyan compound copolymer is grafted to 5 to 20% by weight of a diene-based rubbery polymer having an average particle diameter of 1 to 20 μm.

2. The thermoplastic resin composition according to claim 1, wherein the (meth)acrylate-based rubber is a $C_2$ to $C_8$ alkyl(meth)acrylate polymer.

3. The thermoplastic resin composition according to claim 1, wherein the diene-based rubbery polymer is one or more selected from the group consisting of a butadiene rubbery polymer, a butadiene-styrene rubbery polymer, and an isoprene rubbery polymer.

4. The thermoplastic resin composition according to claim 1, wherein the aromatic vinyl compound-vinyl cyan compound copolymer, as a matrix resin, is a bulk polymerization polymer comprising 60 to 90% by weight of an aromatic vinyl compound and 10 to 40% by weight of a vinyl cyan compound.

5. The thermoplastic resin composition according to claim 1, wherein the aromatic vinyl compound-vinyl cyan compound copolymer, as a matrix resin, has a weight average molecular weight of 80,000 to 250,000 g/mol.

6. The thermoplastic resin composition according to claim 1, wherein the aromatic vinyl compound is one or more selected from the group consisting of styrene, α-methyl styrene, p-methyl styrene, 2,4-dimethyl styrene, and vinyl toluene.

7. The thermoplastic resin composition according to claim 1, wherein the vinyl cyan compound is one or more selected from the group consisting of acrylonitrile, methacrylonitrile, and ethacrylonitrile.

8. The thermoplastic resin composition according to claim 1, wherein the thermoplastic resin composition has a gloss of 22 to 38 measured according to ASTM D523.

9. The thermoplastic resin composition according to claim 1, wherein the thermoplastic resin composition further comprises one or more additives selected from the group consisting of a flame retardant, an antioxidant, an antistatic agent, an anti-dripping agent, a releasing agent, an antimicrobial agent, a heat stabilizer, a lubricant, a UV stabilizer, an impact modifier, a filler, an inorganic additive, a stabilizer, a pigment, and a dye.

10. An extruded article manufactured from the thermoplastic resin composition according to claim 1.

11. The extruded article according to claim 10, wherein the extruded article is an electric and electronic product, an automobile component, a building interior and exterior material, or a furniture interior and exterior material.

* * * * *